Dec. 6, 1949   F. E. NIEDERHISER   2,490,597
MOUNTING MEANS FOR POWER DEVICES
Filed May 31, 1946
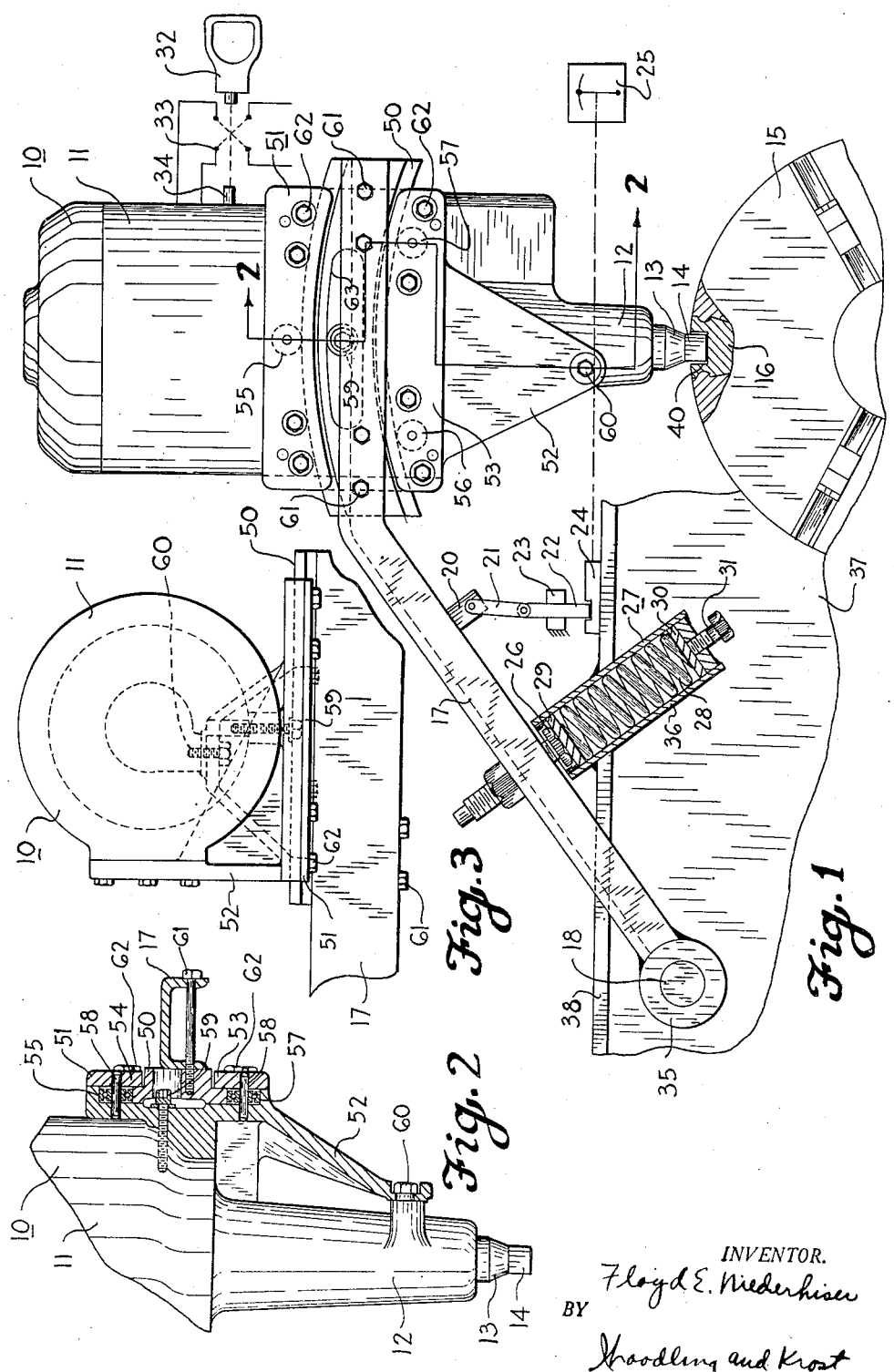
INVENTOR.
Floyd E. Niederhiser
BY
Woodling and Krost
attys.

Patented Dec. 6, 1949

2,490,597

UNITED STATES PATENT OFFICE 2,490,597

MOUNTING MEANS FOR POWER DEVICES

Floyd E. Niederhiser, Cleveland, Ohio

Application May 31, 1946, Serial No. 673,552

4 Claims. (Cl. 279—110)

1

This invention relates to a power operated mechanism for closing and opening work holding jaws which are adapted to grip or hold work pieces while work is done on the work pieces, and in particular to alignment mechanism for power wrenches.

The present invention has particular utility for operating chucks generally regardless of their type because of its efficiency of operation and ease of alignment, but it has additional advantages in connection with machines which are locked in place when not operating, for in the latter case the adjusting socket of the work holding jaws may be stopped only at a relatively closely determined position, and the operating wrench ordinarily used would not be able to engage therewith for operating the device. Thus, by the provision of this invention power wrenches may be used in the type of machinery in which the adjusting mechanism is locked in place, and this type of machinery is therefore made available as is the freely movable type of machine for gripping large and heavy work pieces, where it has been found that considerable time is required and great difficulty encountered for a single workman to close the jaws onto the work piece with the necessary gripping action, and to open the work jaws from the work piece, with the operator using a wrench of suitable leverage.

Accordingly, an object of the present invention is to provide means for quickly, conveniently and safely aligning the work spindle of a power wrench with the operating mechanism used to open and close the jaws of a work holding device.

Another object of my invention is to provide an extremely simplified mounting for a power driven device used to operate the jaws of a work holding device.

A further object of my invention is to provide a simplified mounting for a mechanism used to operate the jaws of a work holding device, which mounting and mechanism can be provided as an attachment to machine tools, or which may be built into machine tools as an integral part thereof.

A still further object of this invention is to provide a safety feature in connection with a mechanism to operate the jaws of a work holding device, by which it is rendered impossible for the operator to start the mechanism when the mechanism is in driving contact with the work holding device, and also to prevent the application of the mechanism to the work holding device while the work holding device is in motion.

Yet another object of my invention is to provide a track and shiftable carriage device to mount a power wrench relative to the actuating mechanism of a work holding device in order to readily adjust the power wrench relative to the actuating mechanism.

Other objects and a fuller understanding of my invention may be had by referring to the following description and claims, taken in conjunction with the accompanying drawing, in which:

Figure 1 of the drawings illustrates the preferred embodiment of my invention as applied to a rotary lathe chuck, and illustrates a fragmentary portion of a lathe on which the device is mounted;

Figure 2 of the drawing is a cross-sectional view along the line 2—2 of Figure 1; and Figure 3 is a top plan view of my improved mounting with the supporting bracket arm broken off.

With reference to the drawing, I illustrate the preferred embodiment of my invention as used in connection with a rotatable lathe chuck 15. The section of the lathe chuck 15 and a portion of a lathe 37 are illustrated for the purpose of illustrating the mode of operation of this preferred embodiment, and not with the intention of limiting the use of my improved device to any one type of machine.

In the illustration, the reference character 10 illustrates generally a power wrench which includes a motor 11, a shaft housing 12, and a shaft 13 extending from the motor 11 to the housing 12. The shaft 13 is formed into a square engaging member 14 at the work engaging end thereof. In the Figure 1, I have shown a conventional pinion drive member 16 ordinarily used to operate the work engaging jaws of the lathe chuck 15. The pinion drive member 16 has a square socket 49 into which the engaging end 14 may be inserted. Of course, if any other type of jaw actuating device is employed, the shaft 13 may be equipped to engage therewith.

My invention will be employed with a method for mounting a power wrench to cause the engaging end 14 to engage with the pinion driving member 16, as described and claimed in my co-pending application Serial No. 659,928, filed April 5, 1946, entitled "Hinge supported motor wrench," now Patent No. 2,470,897. It is of course understood, that my improved mounting device will serve equally well with other methods of mounting the power wrench, and the illustrated support is shown only for the purpose of setting forth the present invention.

In the illustrated mounting, to provide movement of the end 14 into and out of engagement with the socket 40, which is described and claimed in my co-pending application, the shaft 13 and the motor 11 are of unitary construction. Therefore, the entire unit is moved in relation to the pinion drive member 16 in order to engage and disengage the shaft end 14 and the member 16. Means is provided to pivotally mount the power wrench 10 in order to provide the relative movement. This mounting comprises a channel iron bracket 17 of cast or fabricated construction which may be used to support the power wrench 10 on one end thereof, and may be pivotally mounted at the other end thereof by the provision of a collar 35 adapted to pivot about a pivot pin 18. The pivot pin 18 may be secured to the lathe 37 in any suitable manner.

Because the power wrench 10 is pivotally mounted, in this particular adaptation of the power wrench, the tendency will be for gravitational pull to force the engaging end 14 towards the member 16 at all times. Therefore, I have provided a counterbalance 27 to offset this tendency. This counterbalance 27 comprises a housing 36 enclosing a spring 28. An adjustable bumper device 26 is secured to the bracket 17 and is adapted to operate in conjunction with the counterbalance 27. A rider plate 29 is positioned between the spring 28 and the bumper device 26 to provide a smooth surface against which the bumper device 26 may contact. A second rider plate 30 is provided at the lower end of the spring 28. An adjustment screw 31 is provided to extend through the bottom of the housing 36 and push against the rider plate 30. Thus, the spring may be compressed to any desired degree in order to off set the gravitational pull tending to move the power wrench 10 into engagement with the chuck 15. The counterbalance 27 may be secured to the lathe 37 by securing the housing 36 to the lathe 37 in any suitable manner, and is illustrated as being welded in place. Of course, any other convenient type of counterbalance device may be employed to obtain suitable results. It is further to be understood, that this counterbalance is used only in conjunction with the illustrated type of mounting. In the first and second modes of operation previously referred to, in which the entire power wrench 10 is moved bodily, or is provided with an extensible shaft, other modes of counterbalance may be required dependent upon the method of physical support for the entire wrench and my improved mounting therefor.

In order to operate the power wrench 10, I have provided for a control handle 32 to operate a reversing switch 33, and also attached mechanically to a control arm 34. This structure is illustrated diagrammatically in the drawing, because any suitable type of control handle may be employed, and may be positioned in any suitable manner to make the control handle 32 accessible to the operator. In operation, the control handle 32 may be rotated to the right or to the left to operate the reversing switch 33 and cause the motor 11 to rotate in a clockwise or counterclockwise direction as desired, or may be moved to shut off the power and stop the rotation of the motor 11. Also, the handle 32 may be pushed upwardly or pulled downwardly to move the entire power wrench above the pivot pin 18 to bring the engaging end 14 of the shaft 13 into or out of engagement with the socket 40 of the pinion drive member 16.

It is of course understood, that the power means used to rotate the chuck 15 must be turned off while the power wrench is in engagement with the chuck 15, and also, the power wrench 10 must not be brought toward the chuck 15 while the chuck is in motion. In order to provide a safety device which will prevent accidental starting of the chuck 15 while the power wrench is in engagement therewith, and also to prevent the power wrench 10 from being lowered toward the chuck 15 while the chuck is in motion, I have provided a safety lock to operate in conjunction with the lathe power control. This safety device is illustrated diagrammatically to better illustrate the principle of operation. An attachment arm 20 is secured to the lower side of the bracket 17. A link 21 is pivotally secured to the attachment arm 20 at one end thereof and is adapted to operate a pin 22 pivotally connected to the opposite end thereof. A collar 23 is secured to the lathe 37 in any suitable manner and is used to guide the pin 22 in a straight endwise motion. A grooved slide member 24 is adapted to be engaged by the pin 22. This grooved slide 24 is mechanically connected to the lathe control arm of a control box 25 as illustrated by the dot-dash line extending therebetween. Any suitable method of mechanical attachments therebetween in order to cause the lathe control arm and the grooved slide 24 to operate as a unit may be employed. Thus, when the control arm of the box 25 is in the "off" position, the groove of the slide 24 is in position to receive the end of the pin 22. Therefore, the power wrench may pivot about the pin 18 and move downwardly to engage the end 14 of the shaft 13 with the socket 40. However, if the control arm or the box 25 is in any position other than neutral, the groove will be shifted to a position which will not admit the pin 22, and the power wrench 10 canot be moved downwardly to engage therewith. Likewise, once the pin 22 is in engagement with the groove of the slide 24 and the end 14 is in engagement with the socket 40, the control arm of the box 25 cannot be moved accidentally to cause the chuck 15 to rotate. Thus, my improved power wrench may be moved with complete safety and without fear of mechanical damage due to accidental engagement of the power wrench with the moving chuck, or an accidental applying of power to the chuck 15 while the wrench is in engagement therewith.

The features and operation of the present invention may be readily understood by referring to the Figure 1 and the cross-sectional Figure 2 of the drawing in conjunction with the following description. My improved mounting comprises generally a fixed track member 50, and a shiftable carriage device 51. The track 50 is secured to the bracket 17 by any suitable means such for example as by means of the bolts 61. The track 50 is preferably arcuate in form in order that the power wrench 10 may be moved throughout an arcuate path, which path is a portion of a circle substantially concentric about the center of rotation of the chuck 15. That is, the track 50 constitutes preferably an arcuate portion of a circle having its center at the center of rotation of the chuck. Thus, it will readily be seen, that the carriage device 51 will operate throughout an arcuate portion of a circle and carry the power wrench 10 therealong with the longitudinal axis of the shaft 13 always directed substantially radially toward the center of rotation of the chuck 15. Therefore, each portion of the power wrench 10, and in particular the engaging member 14 of the shaft 13, will travel in an arcuate path concentric about the surface of the chuck 15 and consequently will be readily shiftable throughout any portion of the path of travel to engage with the socket 40 wherever it may be positioned within the defined path of travel.

The carriage member 51, in the illustrated embodiment of my improved carriage device, includes a motor bracket 52 which may be firmly secured to the motor 11 by means of a bolt 60 engaging the housing 12, and a stop bolt 59 engaging the motor housing proper. A lower gib plate 53 and an upper gib plate 54 are bolted to the motor bracket 52 as indicated in the drawing, by means of the illustrated hex head cap screws 62. Three rollers 55, 56 and 57 are rotatably mounted by means of roller pins 58 and serve as anti-friction devices whereby the carriage 51 may freely move relative to the track 50. Two of the rollers, namely the rollers 56 and 57, are positioned between the lower gib plate 54 and the body bracket 52 and are spaced a distance apart in order to provide a two-point frictionless support between the carriage 51 and the track 50, and a single roller 55 is placed between the upper gib plate 53 and the body bracket 52 approximately midway between the rollers 56 and 57. By this arrangement of the parts, it has been found that the carriage device 51 is freely shiftable upon the track member 50.

In order to limit the distance of travel of the carriage 51 upon the track 50, I have provided for a longitudinal opening 63 in the track 50. The stop bolt 59 is then provided with an extended head in order to extend outwardly from the motor bracket 52 into the recess provided by the opening 63. As will readily be seen, as the power wrench and the carriage 51 are shifted back and forth on the track 50, the stop bolt 59 will be carried therealong. However, because of the extended head on the stop bolt 59, the limit that it can travel will be determined by the length of the opening 63. Therefore, the carriage 51 will be stopped before the roller 56 or the roller 57, as the case may be, are able to extend beyond the end of the track 50.

The radius of the track 50, of course, will be determined by the particular adaptation to which the improved carriage device is to be employed. However, I have found that many devices may successfully employ the principles of my invention when the center of the arcuate track 50 is not centered at the center of rotation of the device with which it is working.

For instance, I have found that my invention may be successfully employed with the illustrated mounting even though the chuck 15 may be replaced by a similar chuck of either larger or smaller diameter. As the drawing clearly indicates, there is a considerable amount of clearance between the engaging surfaces of the engaging end 14 and the socket 40. Therefore, it is possible to pivot the bracket 17 about the pivot pin 18, and move the carriage device 51 upon the track 50 to align the engaging end 14 with the socket 40 even though a perfect alignment is not maintained.

Although I have described my invention in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. Mounting means to support a power wrench used for tightening and loosening jaw actuating elements of a rotatable chuck, said power wrench including a motor and a shaft for engaging a selected one of the jaw actuating elements, said shaft being drivingly connected to said motor, said mounting means comprising a support member, a track member secured to said support member, said track member defining an arcuate portion of a circle about the rotatable chuck, a shiftable carriage mounted on said track, and means to mount said power wrench upon said carriage with the shaft extending substantially toward the said center of rotation of the chuck, whereby the shaft may be shifted relative to the said selected jaw actuating element to align therewith.

2. In a work holding device having engaging jaws and rotatable jaw actuating elements, with a power driven means for operating the rotatable jaw actuating elements, said power driven means including a rotatable motor driven shaft having engaging surfaces to engage the rotatable jaw actuating elements, the provision of a support device for said motor and shaft, said support device comprising a bracket, track mounting means carried by said bracket, a truck to travel on said track to shiftably mount at least said motor driven shaft upon said track, said truck providing a substantially transverse travel of said shaft relative to the axis of rotation of said jaw actuating elements, and means to provide substantially endwise movement of said shaft into and out of engagement with a selected one of said rotatable jaw actuating elements, whereby the said shaft may be shifted to align with the said selected jaw actuating element and thereafter be brought into turning engagement therewith for tightening or loosening said jaw actuating element.

3. In a work holding device having engaging jaws and rotatable jaw actuating elements, with a power driven means for operating the rotatable jaw actuating elements, said power driven means including a power wrench with a shaft having engaging surfaces to engage the rotatable jaw actuating elements, the provision of a support device for said power wrench, said support device comprising a bracket, shiftable mounting means to shiftably mount said power wrench upon said bracket, said shiftable mounting means including a track member secured to said bracket, a shiftable carriage mounted on said track, and means to mount said power wrench upon said carriage with the shaft extending substantially toward the said rotatable jaw actuating elements, the said shaft thereby being shiftable relative to the said jaw actuating elements to align with a selected one thereof, and means to advance and retract said shaft into and out of engagement with said selected jaw actuating element.

4. A mounting device, comprising a base, a bracket arm, said bracket arm being pivotally mounted at one end thereof on said base, a track member secured on the other end of said bracket arm, and a carriage mounted on said track, said carriage thereby serving as a mounting carriage to align and engage the driving shaft of a power wrench with a jaw actuating element of a work holding device.

FLOYD E. NIEDERHISER.

REFERENCES CITED

The following references are of record in the file of this patent:

UNITED STATES PATENTS

| Number | Name | Date |
|---|---|---|
| 1,695,493 | Holmes | Dec. 18, 1928 |
| 1,763,552 | Cook | June 10, 1930 |
| 1,874,888 | Burrell | Aug. 30, 1932 |
| 2,215,922 | Groene et al. | Sept. 24, 1940 |
| 2,219,851 | Sloan et al. | Oct. 29, 1940 |
| 2,358,049 | Bogart | Sept. 12, 1944 |

FOREIGN PATENTS

| Number | Country | Date |
|---|---|---|
| 56,729 | Sweden | May 17, 1920 |